(12) United States Patent
Mizuno

(10) Patent No.: US 6,370,315 B1
(45) Date of Patent: Apr. 9, 2002

(54) PLAYBACK TIME COMPRESSION AND EXPANSION METHOD AND APPARATUS

(75) Inventor: Toshio Mizuno, Nagoya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/301,310

(22) Filed: Apr. 29, 1999

(30) Foreign Application Priority Data

Apr. 30, 1998 (JP) ............................................ 10-121497

(51) Int. Cl.[7] ................................................. H04N 5/91
(52) U.S. Cl. ............................. 386/46; 386/68; 348/700
(58) Field of Search ................................. 386/1, 33, 45, 386/67–68, 111–112, 125–126; 348/416.1, 699, 700; 375/240.16, 240.12; 382/239, 236

(56) References Cited

U.S. PATENT DOCUMENTS

| | | | | |
|---|---|---|---|---|
| 5,471,239 A | * | 11/1995 | Hill et al. .................... | 348/700 |
| 6,075,918 A | * | 6/2000 | Strongin et al. ............... | 386/68 |
| 6,141,486 A | * | 10/2000 | Lane et al. .................... | 386/68 |
| 6,157,744 A | * | 12/2000 | Nagasaka et al. ........... | 382/236 |

* cited by examiner

Primary Examiner—Wendy R. Garber
Assistant Examiner—Christopher Onuaku
(74) Attorney, Agent, or Firm—Wenderoth, Lind & Ponack, L.L.P.

(57) ABSTRACT

The playback time of a video stream can be expanded by outputting twice frames having a low rate of video change and a low audio level, and the playback time can be compressed by dropping frames having a low rate of video change and a low audio level. The playback time can thus be increased or decreased easily and in a short time compared with methods in which the playback time is increased or decreased by re-editing. The viewer also perceives less unnatural video or audio compared with methods in which the playback time is increased or decreased by varying the playback speed because there is no slowing of image motion with an accompanying drop in audio pitch, nor is there a quickening of image motion with an accompanying rise in audio pitch.

31 Claims, 12 Drawing Sheets

F I G. 2

| EXPAND OR COMPRESS | EXPAND OR COMPRESS PLAYBACK TIME | | | |
|---|---|---|---|---|
| PERCENTAGE CHANGE | xxx % | | | |
| NUMBER OF FRAMES | yyy FRAMES | | | |
| FRAME NO. | RATE OF VIDEO CHANGE | NO-AUDIO | MANIPULATION SEQUENCE NUMBER | MANIPULATION FRAME |
| FRAME 1 | a | ● | 12 | ○ |
| FRAME 2 | b | | 234 | |
| FRAME 3 | c | ● | 6 | ○ |
| ... | | | | |
| FRAME W | w | | 454 | |
| FRAME X | x | ● | 93 | |
| FRAME Y | y | ● | 34 | ○ |
| FRAME Z | z | | 654 | |

FIG. 8

| BLOCK NO. | EXPAND OR COMPRESS |  |  |  |  |
|---|---|---|---|---|---|
| | PERCENTAGE CHANGE | xxx % | | EXPAND OR COMPRESS PLAYBACK TIME | |
| | NUMBER OF FRAMES | yyy FRAMES | | | |
| | FRAME NO. | RATE OF VIDEO CHANGE | NO-AUDIO | MANIPULATION SEQUENCE NUMBER (FOR ENTIRE VIDEO STREAM) | MANIPULATION FRAME |
| 1 | FRAME 1 | a | ● | 12 | ○ |
| | FRAME 2 | b | | 234 | |
| | FRAME 3 | c | ● | 3 | ○ |
| ... | ... | ... | ... | ... | ... |
| α | FRAME W | w | | 24 | |
| | FRAME X | x | ● | 2 | |
| | FRAME Y | y | ● | 1 | |
| | FRAME Z | z | | 254 | ○ |

FIG. 11

| BLOCK NO. | EXPAND OR COMPRESS | | | | |
|---|---|---|---|---|---|
| | PERCENTAGE CHANGE | | EXPAND OR COMPRESS PLAYBACK TIME | | |
| | | | xxx % | | |
| | NUMBER OF MANIPULATION FRAMES PER BLOCK | | zzz FRAMES | | |
| | FRAME NO. | RATE OF VIDEO CHANGE | NO-AUDIO | MANIPULATION SEQUENCE NUMBER (PER BLOCK) | MANIPULATION FRAME |
| 1 | FRAME 1 | a | | 12 | ○ |
| | FRAME 2 | b | ● | 234 | |
| | FRAME 3 | c | ● | 1 | ○ |
| | ... | ... | ... | ... | ... |
| α | FRAME W | w | | 24 | |
| | FRAME X | x | ● | 13 | |
| | FRAME Y | y | ● | 1 | |
| | FRAME Z | z | | 254 | ○ |

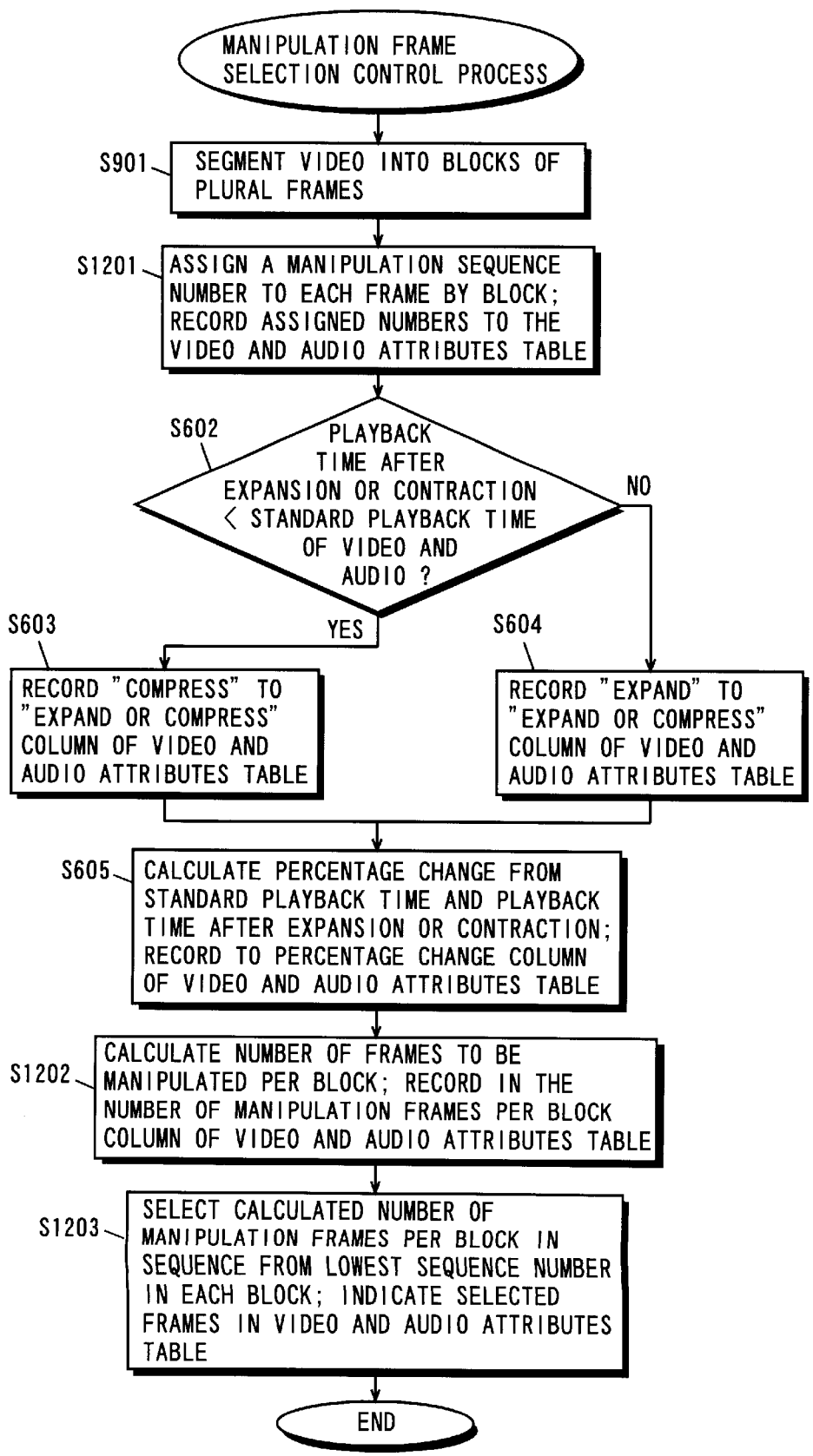

PLAYBACK TIME COMPRESSION AND EXPANSION METHOD AND APPARATUS

BACKGROUND OF THE INVENTION

1. Field of the Invention

The present invention relates to a method for processing video, and relates more specifically to a method for compressing and expanding the playback time of digitized video.

2. Description of the Background Art

Nonlinear editing systems are widely used today by, for example, broadcasting studios and video production companies. Nonlinear editing systems capture digitized video to a computer so that the video can be processed in memory, and can therefore accomplish such editing tasks as scene selection and applying special effects much more quickly and easily than is possible with conventional tape-based editing systems.

There are times, however, when it is desirable to increase or decrease (expand or compress) the playback time of the edited video when video edited on a nonlinear editing system is reproduced. For example, late-breaking news may cause a disruption in the broadcasting schedule in which the edited video is to be broadcast, and the available broadcasting time may change. This change can be eliminated or absorbed, however, by compressing or expanding the playback time of the edited video.

The playback time of edited video has conventionally been compressed or expanded by either changing the playback speed, or by re-editing the edited video to delete part of the video or add another part as necessary.

When the former method is used to increase or decrease the playback time of the edited video, however, image motions become slower and the associated audio drops in pitch, or motions become faster and the audio rises in pitch. In either case, the video and audio appear unnatural to the viewer. Using the latter method to re-edit the edited video, however, increases the work load on the operator and takes additional editing time.

SUMMARY OF THE INVENTION

Therefore, an object of the present invention is to provide a playback time compression and expansion method and apparatus whereby the playback time of digitized video can be increased or decreased easily and in a short period of time without the viewer perceiving unnatural video or audio.

The present invention has the following features to achieve the object above.

A first aspect of the present invention is directed to a playback time expansion method for lengthening a playback time of digitized video, comprising:

a step for measuring a rate of video change for all frames in the digitized video, the rate of video change indicating how much video in a particular frame has changed compared with video in a frame before and a frame after;

a step for recording the video;

a step for calculating a number of manipulation frames based on a playback time before the video playback time expansion and a playback time after the video playback time expansion, the number of manipulation frames indicating a number of frames to be manipulated in the total number of frames in the video;

a step for selecting a number of frames equal to the number of manipulation frames from among all frames in the video in sequence from the lowest rate of video change; and a step for outputting recorded video;

wherein the step for outputting recorded video is characterized by manipulating the selected frames such that the video of each selected frame is output a plurality of times.

By thus outputting the video of frames having a low rate of video change a plurality of times to increase the playback time, a playback time expansion method as set forth in the first aspect of the invention can increase the playback time easily and in a short time compared with methods in which the playback time is increased by re-editing. In addition, the viewer also perceives less unnatural video compared with methods in which the playback time is increased by varying the playback speed because there is no slowing of image motion.

A second aspect of the present invention is directed to a playback time expansion method as set forth in the first aspect of the invention, wherein digitized audio is associated with the video, the method further comprises:

a step for measuring an audio level for every frame in the video, and the step for frame selection is characterized by selecting frames with priority for frames in which the audio level is below a predetermined level.

By thus outputting the video of frames having a low rate of video change and a low audio level a plurality of times to increase the playback time, a playback time expansion method as set forth in the second aspect of the invention can increase the playback time easily and in a short time compared with methods in which the playback time is increased by re-editing. In addition, the viewer also perceives less unnatural video and audio compared with methods in which the playback time is increased by varying the playback speed because there is no slowing of image motion and lowering of audio pitch.

A third aspect of the present invention is directed to a playback time expansion method as set forth in the first aspect of the invention, further comprising:

a step for segmenting the total number of frames in the video into a plurality of blocks;

wherein the step for frame selection is characterized by selecting a frame from one of a plurality of the blocks, and then selecting a next frame from a block other than the one block.

By thus dispersing the manipulated frames through a wider range, a playback time expansion method as set forth in the third aspect of the invention can prevent viewer perception of unnatural video resulting from a concentration of manipulation frames in a particular part of the video.

A fourth aspect of the present invention is directed to a playback time expansion method as set forth in the first aspect of the invention, further comprising:

a step for segmenting the total number of frames in the video into a plurality of blocks;

wherein the step for frame selection is characterized by selecting a frame from one of a plurality of the blocks, and then selecting a next frame from a block other than the one block and any block adjacent thereto.

By thus dispersing the manipulated frames through an even wider range, a playback time expansion method as set forth in the third aspect of the invention can prevent viewer perception of unnatural video resulting from a concentration of manipulation frames in a particular part of the video.

A fifth aspect of the present invention is directed to a playback time expansion method as set forth in the first aspect of the invention, further comprising:

a step for segmenting the total number of frames in the video into a plurality of blocks;
wherein the step for frame selection is characterized by selecting frames equally from the plurality of blocks.

By thus dispersing the manipulated frames evenly throughout all frames, a playback time expansion method as set forth in the fifth aspect of the invention can prevent viewer perception of unnatural video resulting from a concentration of manipulation frames in a particular part of the video.

A sixth aspect of the present invention is directed to a playback time compression method for shortening a playback time of digitized video, comprising:
a step for measuring a rate of video change for all frames in the digitized video,
the rate of video change indicating how much video in a particular frame has changed compared with video in a frame before and a frame after;
a step for recording the video;
a step for calculating a number of manipulation frames based on a playback time before the video playback time compression and a playback time after the video playback time compression,
the number of manipulation frames indicating a number of frames to be manipulated in the total number of frames in the video;
a step for selecting a number of frames equal to the number of manipulation frames from among all frames in the video in sequence from the lowest rate of video change; and
a step for outputting recorded video;
wherein the step for outputting recorded video is characterized by manipulating the selected frames such that the video of each selected frame is not output.

By thus dropping the video of frames having a low rate of video change to decrease the playback time, a playback time expansion method as set forth in the sixth aspect of the invention can decrease the playback time easily and in a short time compared with methods in which the playback time is decreased by re-editing. In addition, the viewer also perceives less unnatural video compared with methods in which the playback time is decreased by varying the playback speed because there is no quickening of image motion.
e A seventh aspect of the present invention is directed to a playback time compression method as set forth in the sixth aspect of the invention, wherein digitized audio is associated with the video, the method further comprises:
a step for measuring an audio level for every frame in the video, and
the step for frame selection is characterized by selecting frames with priority for frames in which the audio level is below a predetermined level.

By thus dropping the video of frames having a low rate of video change and a low audio level to decrease the playback time, a playback time compression method as set forth in the seventh aspect of the invention can decrease the playback time easily and in a short time compared with methods in which the playback time is decreased by re-editing. In addition, the viewer also perceives less unnatural video and audio compared with methods in which the playback time is decreased by varying the playback speed because there is no quickening of image motion and increase in the audio pitch.

An eighth aspect of the present invention is directed to a playback time compression method as set forth in the sixth aspect of the invention, further comprising:

a step for segmenting the total number of frames in the video into a plurality of blocks;
wherein the step for frame selection is characterized by selecting a frame from one of a plurality of the blocks, and then selecting a next frame from a block other than the one block.

By thus dispersing the manipulated frames through a wider range, a playback time expansion method as set forth in the eighth aspect of the invention can prevent viewer perception of unnatural video resulting from a concentration of manipulation frames in a particular part of the video.

A ninth aspect of the present invention is directed to a playback time compression method as set forth in the sixth aspect of the invention, further comprising:
a step for segmenting the total number of frames in the video into a plurality of blocks;
wherein the step for frame selection is characterized by selecting a frame from one of a plurality of the blocks, and then selecting a next frame from a block other than the one block and any block adjacent thereto.

By thus dispersing the manipulated frames through an even wider range, a playback time expansion method as set forth in the ninth aspect of the invention can prevent viewer perception of unnatural video resulting from a concentration of manipulation frames in a particular part of the video.

A tenth aspect of the present invention is directed to a playback time compression method as set forth in the sixth aspect of the invention, further comprising:
a step for segmenting the total number of frames in the video into a plurality of blocks;
wherein the step for frame selection is characterized by selecting frames equally from the plurality of blocks.

By thus dispersing the manipulated frames evenly throughout all frames, a playback time expansion method as set forth in the tenth aspect of the invention can prevent viewer perception of unnatural video resulting from a concentration of manipulation frames in a particular part of the video.

An eleventh aspect of the present invention is directed to an apparatus for lengthening a playback time of digitized video, comprising:
rate of video change measuring means for measuring a rate of video change for all frames in the digitized video,
the rate of video change indicating how much video in a particular frame has changed compared with video in a frame before and a frame after;
recording means for recording the video;
calculating means for calculating a number of manipulation frames based on a playback time before the video playback time expansion and a playback time after the video playback time expansion,
the number of manipulation frames indicating a number of frames to be manipulated in the total number of frames in the video;
frame selecting means for selecting a number of frames equal to the number of manipulation frames from among all frames in the video in sequence from the lowest rate of video change; and
output means for outputting video recorded by the recording means;
wherein the output means is characterized by manipulating the selected frames during video output such that the video of each frame selected by the frame selecting means is output a plurality of times.

By thus outputting the video of frames having a low rate of video change a plurality of times to increase the playback time, the eleventh aspect of the invention can increase the playback time easily and in a short time compared with methods in which the playback time is increased by re-editing. In addition, the viewer also perceives less unnatural video compared with methods in which the playback time is increased by varying the playback speed because there is no slowing of image motion.

A twelfth aspect of the present invention is directed to a playback time expansion apparatus as set forth in the eleventh aspect of the invention, wherein digitized audio is associated with the video, the apparatus further comprises:

audio level measuring means for measuring an audio level for every frame in the video, and the frame selecting means is characterized by selecting frames with priority for frames in which the audio level is below a predetermined level.

By thus outputting the video of frames having a low rate of video change and a low audio level a plurality of times to increase the playback time, the twelfth aspect of the invention can increase the playback time easily and in a short time compared with methods in which the playback time is increased by re-editing. In addition, the viewer also perceives less unnatural video and audio compared with methods in which the playback time is increased by varying the playback speed because there is no slowing of image motion and lowering of audio pitch.

A thirteenth aspect of the present invention is directed to a playback time expansion apparatus as set forth in the eleventh aspect of the invention, further comprising:

means for segmenting the total number of frames in the video into a plurality of blocks;
wherein the frame selecting means is characterized by selecting a frame from one of a plurality of the blocks, and then selecting a next frame from a block other than the one block.

By thus dispersing the manipulated frames through a wider range, the thirteenth aspect of the invention can prevent viewer perception of unnatural video resulting from a concentration of manipulation frames in a particular part of the video.

A fourteenth aspect of the present invention is directed to a playback time expansion apparatus as set forth in the eleventh aspect of the invention, further comprising:

means for segmenting the total number of frames in the video into a plurality of blocks;
wherein the frame selecting means is characterized by selecting a frame from one of a plurality of the blocks, and then selecting a next frame from a block other than the one block and any block adjacent thereto.

By thus dispersing the manipulated frames through an even wider range, the fourteenth aspect of the invention can prevent viewer perception of unnatural video resulting from a concentration of manipulation frames in a particular part of the video.

A fifteenth aspect of the present invention is directed to a playback time expansion apparatus as set forth in the eleventh aspect of the invention, further comprising:

means for segmenting the total number of frames in the video into a plurality of blocks;
wherein the frame selecting means is characterized by selecting frames equally from the plurality of blocks.

By thus dispersing the manipulated frames evenly throughout all frames, the fifteenth aspect of the invention can prevent viewer perception of unnatural video resulting from a concentration of manipulation frames in a particular part of the video.

A sixteenth aspect of the present invention is directed to a playback time compression apparatus for shortening a playback time of digitized video, comprising:

rate of video change measuring means for measuring a rate of video change for all frames in the digitized video,
the rate of video change indicating how much video in a particular frame has changed compared with video in a frame before and a frame after;
recording means for recording the video;
calculating means for calculating a number of manipulation frames based on a playback time before the video playback time compression and a playback time after the video playback time compression,
the number of manipulation frames indicating a number of frames to be manipulated in the total number of frames in the video;
frame selecting means for selecting a number of frames equal to the number of manipulation frames from among all frames in the video in sequence from the lowest rate of video change; and
output means for outputting video recorded by the recording means;
wherein the output means is characterized by manipulating the selected frames during video output such that the video of each frame selected by the frame selecting means is not output.

By thus dropping the video of frames having a low rate of video change to decrease the playback time, the sixteenth aspect of the invention can decrease the playback time easily and in a short time compared with methods in which the playback time is decreased by re-editing. In addition, the viewer also perceives less unnatural video compared with methods in which the playback time is decreased by varying the playback speed because there is no quickening of image motion.

A seventeenth aspect of the present invention is directed to a playback time compression apparatus as set forth in the sixteenth aspect of the invention, wherein digitized audio is associated with the video, the apparatus further comprises:

audio level measuring means for measuring an audio level for every frame in the video, and
the frame selecting means is characterized by selecting frames with priority for frames in which the audio level is below a predetermined level.

By thus dropping the video of frames having a low rate of video change and a low audio level to decrease the playback time, the seventeenth aspect of the invention can decrease the playback time easily and in a short time compared with methods in which the playback time is decreased by re-editing. In addition, the viewer also perceives less unnatural video and audio compared with methods in which the playback time is decreased by varying the playback speed because there is no quickening of image motion and increase in the audio pitch.

An eighteenth aspect of the present invention is directed to a playback time compression apparatus as set forth in the sixteenth aspect of the invention, further comprising:

means for segmenting the total number of frames in the video into a plurality of blocks;
wherein the frame selecting means is characterized by selecting a frame from one of a plurality of the blocks, and then selecting a next frame from a block other than the one block.

By thus dispersing the manipulated frames through an even wider range, the eighteenth aspect of the invention can prevent viewer perception of unnatural video resulting from a concentration of manipulation frames in a particular part of the video.

A nineteenth aspect of the present invention is directed to a playback time compression apparatus as set forth in the sixteenth aspect of the invention, further comprising:

means for segmenting the total number of frames in the video into a plurality of blocks;
wherein the frame selecting means is characterized by selecting a frame from one of a plurality of the blocks, and then selecting a next frame from a block other than the one block and any block adjacent thereto.

By thus dispersing the manipulated frames through an even wider range, the nineteenth aspect of the invention can prevent viewer perception of unnatural video resulting from a concentration of manipulation frames in a particular part of the video.

A twentieth aspect of the present invention is directed to a playback time compression apparatus as set forth in the sixteenth aspect of the invention, further comprising:

means for segmenting the total number of frames in the video into a plurality of blocks;
wherein the frame selecting means is characterized by selecting frames equally from the plurality of blocks.

By thus dispersing the manipulated frames evenly throughout all frames, the twentieth aspect of the invention can prevent viewer perception of unnatural video resulting from a concentration of manipulation frames in a particular part of the video.

A twenty-first aspect of the present invention is directed to a recording medium for recording a computer executable program achieving an operating environment for lengthening a playback time of digitized video, the program comprising:

a step for measuring a rate of video change for all frames in the digitized video,
the rate of video change indicating how much video in a particular frame has changed compared with video in a frame before and a frame after;
a step for recording the video;
a step for calculating a number of manipulation frames based on a playback time before the video playback time expansion and a playback time after the video playback time expansion,
the number of manipulation frames indicating a number of frames to be manipulated in the total number of frames in the video;
a step for selecting a number of frames equal to the number of manipulation frames from among all frames in the video in sequence from the lowest rate of video change; and
a step for outputting recorded video;
wherein the step for outputting recorded video is characterized by manipulating the selected frames such that the video of each selected frame is output a plurality of times.

A twenty-second aspect of the present invention is directed to a recording medium as set forth in the twenty-first aspect of the invention for recording a computer executable program achieving an operating environment wherein digitized audio is associated with the video, and the program further comprises:

a step for measuring an audio level for every frame in the video, and
the step for frame selection is characterized by selecting frames with priority for frames in which the audio level is below a predetermined level.

A twenty-third aspect of the present invention is directed to a recording medium as set forth in the twenty-first aspect of the invention for recording a computer executable program achieving an operating environment further comprising:

a step for segmenting the total number of frames in the video into a plurality of blocks;
wherein the step for frame selection is characterized by selecting a frame from one of a plurality of the blocks, and then selecting a next frame from a block other than the one block.

A twenty-fourth aspect of the present invention is directed to a recording medium as set forth in the twenty-first aspect of the invention for recording a computer executable program achieving an operating environment further comprising:

a step for segmenting the total number of frames in the video into a plurality of blocks;
wherein the step for frame selection is characterized by selecting a frame from one of a plurality of the blocks, and then selecting a next frame from a block other than the one block and any block adjacent thereto.

A twenty-fifth aspect of the present invention is directed to a recording medium as set forth in the twenty-first aspect of the invention for recording a computer executable program achieving an operating environment further comprising:

a step for segmenting the total number of frames in the video into a plurality of blocks;
wherein the step for frame selection is characterized by selecting frames equally from the plurality of blocks.

A twenty-sixth aspect of the present invention is directed to a recording medium for recording a computer executable program achieving an operating environment for shortening a playback time of digitized video, the program comprising:

a step for measuring a rate of video change for all frames in the digitized video,
the rate of video change indicating how much video in a particular frame has changed compared with video in a frame before and a frame after;
a step for recording the video;
a step for calculating a number of manipulation frames based on a playback time before the video playback time compression and a playback time after the video playback time compression,
the number of manipulation frames indicating a number of frames to be manipulated in the total number of frames in the video;
a step for selecting a number of frames equal to the number of manipulation frames from among all frames in the video in sequence from the lowest rate of video change; and
a step for outputting recorded video;
wherein the step for outputting recorded video is characterized by manipulating the selected frames such that the video of each selected frame is not output.

A twenty-seventh aspect of the present invention is directed to a recording medium as set forth in the twenty-sixth aspect of the invention for recording a computer executable program achieving an operating environment wherein digitized audio is associated with the video, and the program further comprises:

a step for measuring an audio level for every frame in the video, and the step for frame selection is characterized by selecting frames with priority for frames in which the audio level is below a predetermined level.

A twenty-eighth aspect of the present invention is directed to a recording medium as set forth in the twenty-sixth aspect of the invention for recording a computer executable program achieving an operating environment further comprising:

a step for segmenting the total number of frames in the video into a plurality of blocks;
wherein the step for frame selection is characterized by selecting a frame from one of a plurality of the blocks, and then selecting a next frame from a block other than the one block.

A twenty-ninth aspect of the present invention is directed to a recording medium as set forth in the twenty-sixth aspect of the invention for recording a computer executable program achieving an operating environment further comprising:

a step for segmenting the total number of frames in the video into a plurality of blocks;
wherein the step for frame selection is characterized by selecting a frame from one of a plurality of the blocks, and then selecting a next frame from a block other than the one block and any block adjacent thereto.

A thirtieth aspect of the present invention is directed to a recording medium as set forth in the twenty-sixth aspect of the invention for recording a computer executable program achieving an operating environment further comprising:

a step for segmenting the total number of frames in the video into a plurality of blocks;
wherein the step for frame selection is characterized by selecting frames equally from the plurality of blocks.

A thirty-first aspect of the present invention is directed to a playback time expansion and compression method for lengthening or shortening a playback time of digitized video, comprising:

a step for measuring a rate of video change for all frames in the digitized video,
the rate of video change indicating how much video in a particular frame has changed compared with video in a frame before and a frame after;
a step for recording the video;
a step for determining a manipulation sequence number for every frame in the video in relation to the rate of video change,
the manipulation sequence number indicating a sequence in which the frames are to be manipulated;
a step for compiling a table recording the manipulation sequence numbers;
a step for calculating a number of manipulation frames based on a playback time before the video playback time expansion/compression and a playback time after the video playback time expansion/compression,
the number of manipulation frames indicating a number of frames to be manipulated in the total number of frames in the video;
a step for selecting, in reference to the table, a number of frames equal to the number of manipulation frames from among all frames in the video in sequence from the lowest rate of video change; and
a step for outputting recorded video;

wherein the step for outputting recorded video is characterized by manipulating the selected frames such that
when the playback time is lengthened, the video of each selected frame is output a plurality of times, and
when the playback time is shortened, the video of each selected frame is not output.

As described above, the thirty-first aspect of the present invention outputs the video of frames having a low rate of video change a plurality of times to increase the playback time, and drops the video of frames having a low rate of video change to decrease the playback time. As a result, it can increase or decrease the playback time easily and in a short time compared with methods in which the playback time is decreased by re-editing. In addition, the viewer also perceives less unnatural video compared with methods in which the playback time is decreased by varying the playback speed because image motion does not become faster or slower. Moreover, because a table containing manipulation sequence numbers is compiled and the manipulation frames are selected with reference to this table, once the table is compiled, the playback time can thereafter be easily and freely increased or decreased.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an exemplary video and audio attributes table in which measurements are stored by the video change accumulator 101 and audio level accumulator 102 in a playback time expansion/compression apparatus in FIG. 1 according to a first embodiment of the present invention, and manipulation sequence numbers are written by the controller 104;

FIG. 8 is an exemplary video and audio attributes table in which measurements are stored by the video change accumulator 101 and audio level accumulator 102, and manipulation sequence numbers are written by the controller 104, in a playback time expansion/compression apparatus 10 shown in FIG. 1 according to a second embodiment and a third embodiment of the present invention;

FIG. 11 is an exemplary video and audio attributes table in which measurements are stored by the video change accumulator 101 and audio level accumulator 102, and manipulation sequence numbers are written by the controller 104, in a playback time expansion/compression apparatus 10 shown in FIG. 1 according to a fourth embodiment of the present invention;

FIG. 12 is a flow chart of the frame selection control process performed by the controller 104 in FIG. 1 in a playback time expansion/compression apparatus 10 according to a fourth embodiment of the present invention.

DESCRIPTION OF THE PREFERRED EMBODIMENTS

The preferred embodiments of the present invention are described below with reference to the accompanying figures.

Embodiment 1

Figure 1:
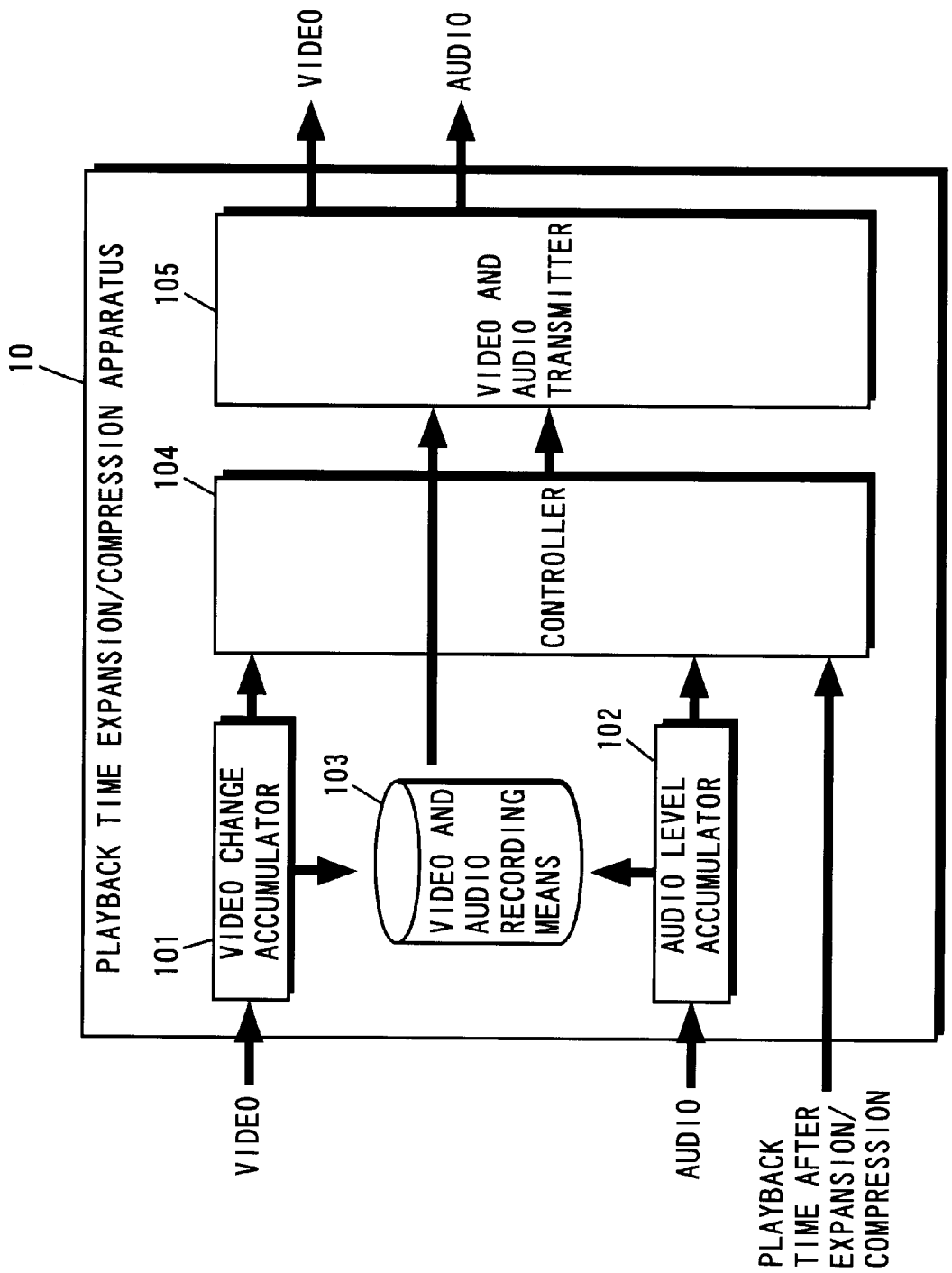
FIG. 1 is a block diagram showing the functional configuration of a playback time expansion/compression apparatus according to a first embodiment of the present invention, and used to describe second to fourth embodiments of the present invention.

FIG. 1 is a block diagram showing the functional configuration of a playback time expansion/compression apparatus 10 according to the first preferred embodiment of the present invention. As shown in FIG. 1, this playback time expansion/compression apparatus 10 comprises a video change accumulator 101; an audio level accumulator 102; video and audio recording means 103; a controller 104; and a video and audio transmitter 105.

The video change accumulator 101 measures the change between a current image frame and the frames before and after the current image frame in an input video stream, and accumulates the measured video change rate (described below) information to a video and audio attributes table (described below).

The audio level accumulator 102 measures the audio level in each in each frame of an input audio stream, and likewise accumulates the measured audio level information to the video and audio attributes table.

The video and audio recording means 103 records input video and audio. Based on the measurements obtained by the video change accumulator 101 and audio level accumulator 102, the controller 104 assigns a manipulation sequence number (described below) to each frame, and writes the assigned numbers to the video and audio attributes table.

The video and audio transmitter 105 outputs the video and audio by referring to the video and audio attributes table, and thereby increases or decreases (expands or compresses) the video and audio playback time to achieve a specified playback time.

It should be noted that the elements described above can be achieved using, for example, a computer (not shown in the figures) comprising a CPU and memory or disk storage. In this case, the CPU performs processes for increasing or decreasing the video playback time according to a software program stored in memory or on disk. The software program can be supplied to the computer on such storage media as a floppy disk or CD-ROM, or by a telecommunications line.

The video and associated audio of a movie or program edited using a nonlinear editing system (not shown in the figures), for example, is input to a playback time expansion/compression apparatus 10 comprised as described above. It should be further noted that the video and audio is digital data that can be processed and recorded in frame units by a computer. By applying a specific process to the input video and audio, the playback time expansion/compression apparatus 10 increases or decreases the playback time of the video and audio input thereto in such a manner that the video and audio does not appear either visually or audibly unnatural to the user. The process performed by the playback time expansion/compression apparatus 10 to accomplish this is described next in detail.

When the playback time expansion/compression apparatus 10 is activated and the video and audio to be expanded or contracted is input thereto, the video and audio are passed through the video change accumulator 101 and audio level accumulator 102 and then stored by the video and audio recording means 103. At this time the video change accumulator 101 performs a process for measuring the rate of change in the video component of each video frame compared with the video in the frames before and after that frame, and storing the result of this measurement to the video and audio attributes table. It should be noted that this rate of change between a frame and the frames before and after is a quantity indicative of how much the video in that frame has changed compared with the video in the before and after frames. Also at this time, the audio level accumulator 102 performs a process for measuring the audio level in each frame, and storing the resulting audio level information to the video and audio attributes table.

FIG. 2 is an exemplary video and audio attributes table in which measurements are stored by the video change accumulator 101 and audio level accumulator 102, and manipulation sequence numbers are written by the controller 104. It should be noted that the video change accumulator 101, audio level accumulator 102, and controller 104 each stores a video and audio attributes table identical to that shown in FIG. 2.

The video and audio attributes table shown in FIG. 2 has columns for storing for each frame: the rate of video change; whether there is any audio; the manipulation sequence number; and whether the frame is a manipulation frame, that is, whether the frame is to be used for playback time manipulation. Note that in this example "no audio" is stored to the table when the audio level is equal to or below a specified level rather than recording the audio level itself. Note, further, that three additional items are stored for the video and audio stream. These are: expand or compress, that is, whether to increase or decrease the playback time; percentage change, that is, how much the playback time is to change relative to the standard playback time (the playback time before compression or expansion) after the playback time is increased or decreased; and the number of manipulation frames, that is, the number of frames to be manipulated to achieve the desired percentage change.

Figure 3:
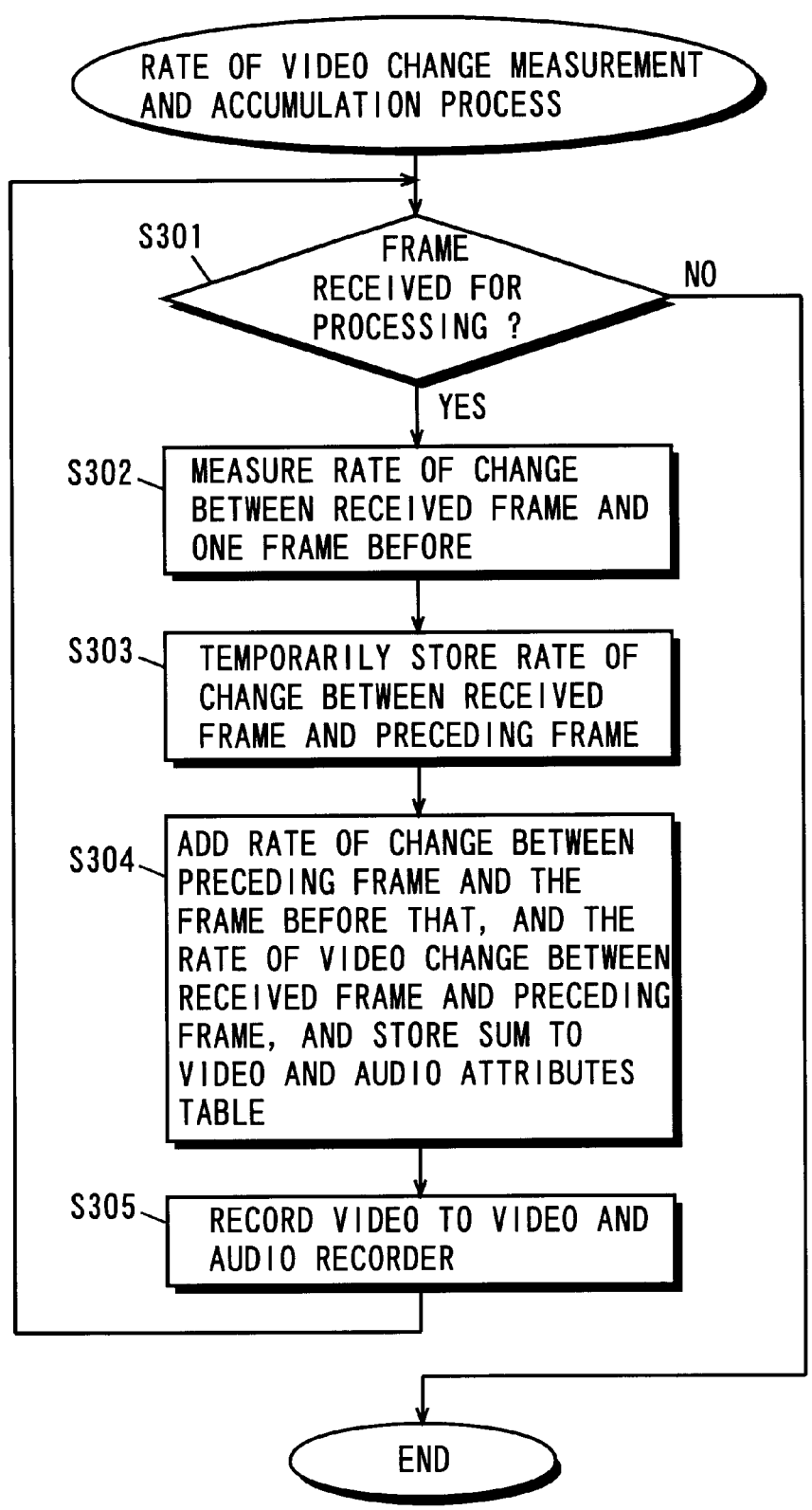
FIG. 3 is a flow chart of the process performed by the video change accumulator 101 shown in FIG. 1.
Figure 4:
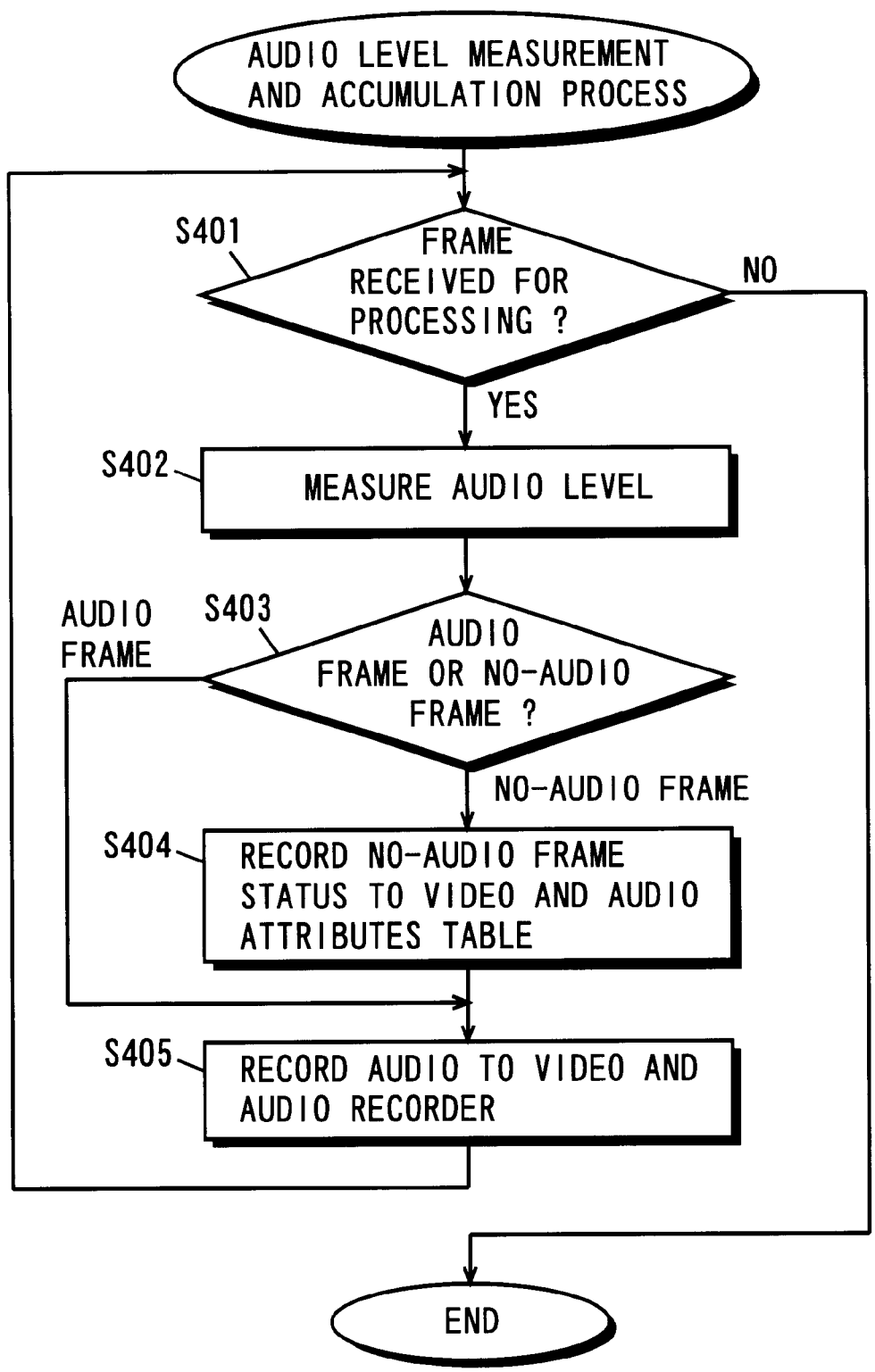
FIG. 4 is a flow chart of the process performed by the audio level accumulator 102 shown in FIG. 1.

FIG. 3 is a flow chart of the process performed by the video change accumulator 101 shown in FIG. 1. FIG. 4 is a flow chart of the process performed by the audio level accumulator 102 shown in FIG. 1.

The operation of the video change accumulator 101 is described first with reference to the flow chart in FIG. 3.

Step S301 first determines whether there is a received frame to process video. If there is, the procedure from step S302 to step S305 is performed for that frame. When all frames have been received and step S301 returns no, the procedure ends.

When there is a received frame to process, the video change accumulator 101 measures the rate of video change between the received frame and the preceding frame (step S302), and then temporarily stores the result, that is, the rate of video change between the received frame and the preceding frame (step S303). The rate of change between the temporarily stored preceding frame and the frame preceding the preceding frame, and the rate of change between the preceding frame and the received frame, are then added, and the sum is written as the rate of video change for the preceding frame to the rate of video change column for that frame in the video and audio attributes table (FIG. 2) (step S304). The video change accumulator 101 then commands the video and audio recording means 103 for recording the video data for the received frame 103 (step S305), and then returns to step S301.

An exemplary method for measuring the video rate of change is described next below.

Figure 5:
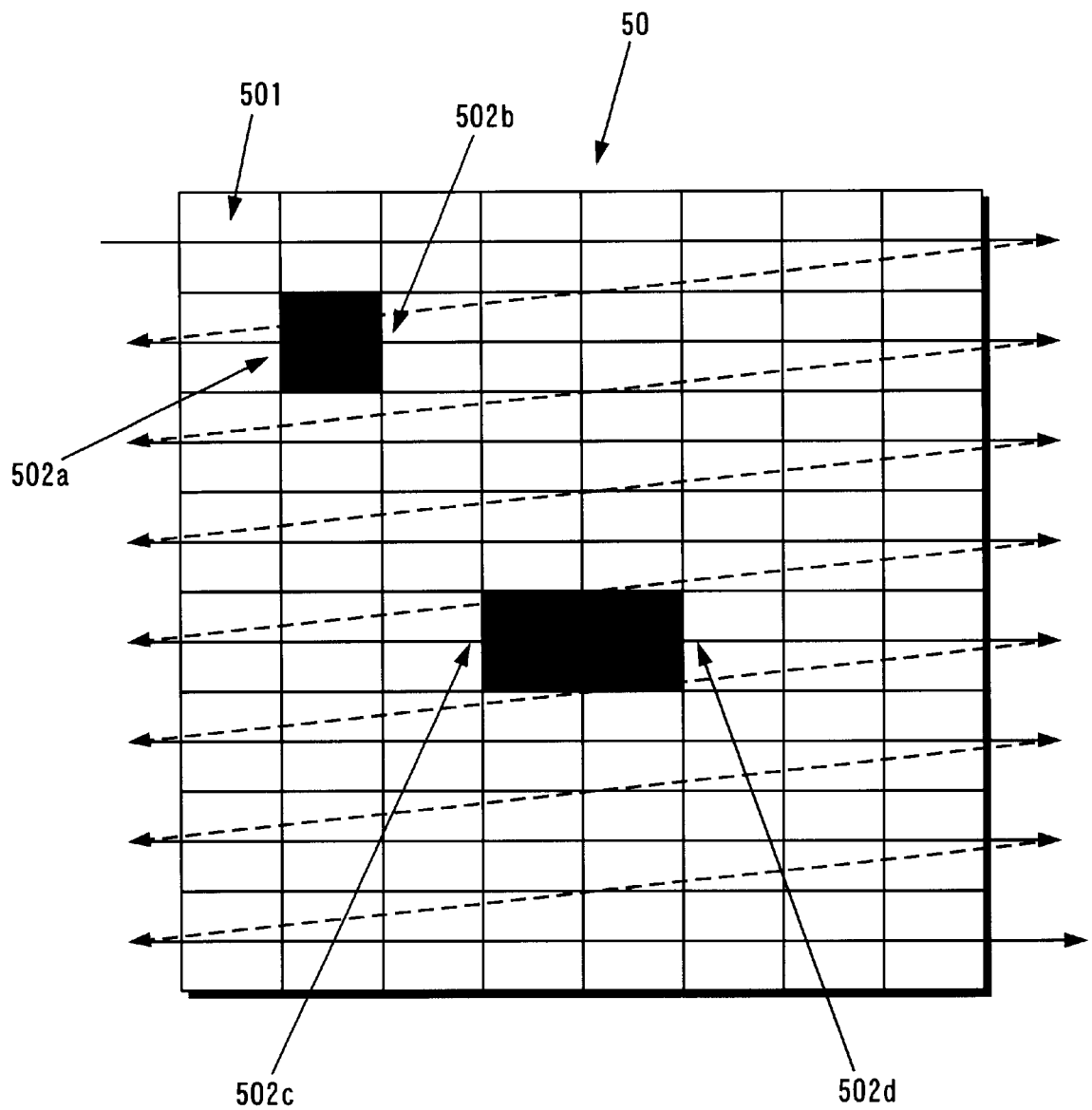
FIG. 5 shows one frame of video input to the playback time expansion/compression apparatus 10 in FIG. 1.

FIG. 5 shows one frame of video input to the playback time expansion/compression apparatus 10 in FIG. 1. As shown in FIG. 5, one frame 50 comprises a plurality of pixels 501. In a typical monitor (not shown in the figures), the pixels 501 are sequentially scanned from side to side, top to bottom, by an electron beam to present the video contained in frame 50 on the screen. When the value of the video signal (an RGB signal, for example) changes at the boundary between one pixel 501 and the next pixel 501 during this scanning process, there will be four points of change 502a to 502d in the frame 50 where a "point of change" is the pixel-pixel boundary where the signal level changes. Points of change 502a and 502c are where the video signal changes from white to black, and points of change 502b and 502d are where the video signal changes from black to white.

A list of the location and content of each of these points of change is compiled for each frame 50 in the input video. To obtain the rate of change between one frame 50 (frame 50a, for example) and another frame (frame 50b, for example), the point of change list (not shown in the figures) for frame 50a is compared with the point of change list for frame 50b. The number of points of change for frame 50a that are different in position or content from the points of change in frame 50b are counted, and the resulting count is used as the video rate of change.

The operation of the audio level accumulator 102 is described first with reference to the flow chart in FIG. 4.

Step S401 first determines if a frame has been received for processing audio. If there is, the procedure from step S402 to step S405 is performed for that frame. When all frames have been received and step S401 returns no, the procedure ends.

When there is a received frame to process, the audio level accumulator 102 measures the audio level of the received frame (step S402), and based on the resulting audio level determines whether that frame is a no-audio frame (step S403). Whether a frame is a no-audio frame or not is determined as follows, for example. That is, a specific threshold value is set, and the audio level measured in step S402 is compared with this threshold value. If the measured audio level is below the threshold value, that frame is defined as a no-audio frame; if the audio level is greater than or equal to the threshold value, that frame is defined as an audio frame.

If a frame is determined by step S403 to be a no-audio frame, the audio level accumulator 102 records a symbol, a bullet mark in this example, indicating that the frame is a no-audio frame in the no-audio column of the video and audio attributes table (FIG. 2) (step S404). Note that in this example the no-column is left blank for frames determined to contain audio. The audio level accumulator 102 then commands the video and audio recording means 103 for recording the audio data for the received frame (step S405) and then returns to step S401.

This completes both recording the input video and audio, and measuring and accumulating the rate of video change and audio level data for each frame. A manipulation sequence number is then assigned to each frame based on the accumulated rate of video change and audio level information, and a process for selecting the manipulation frames is then performed based on these assigned numbers.

Figure 6:
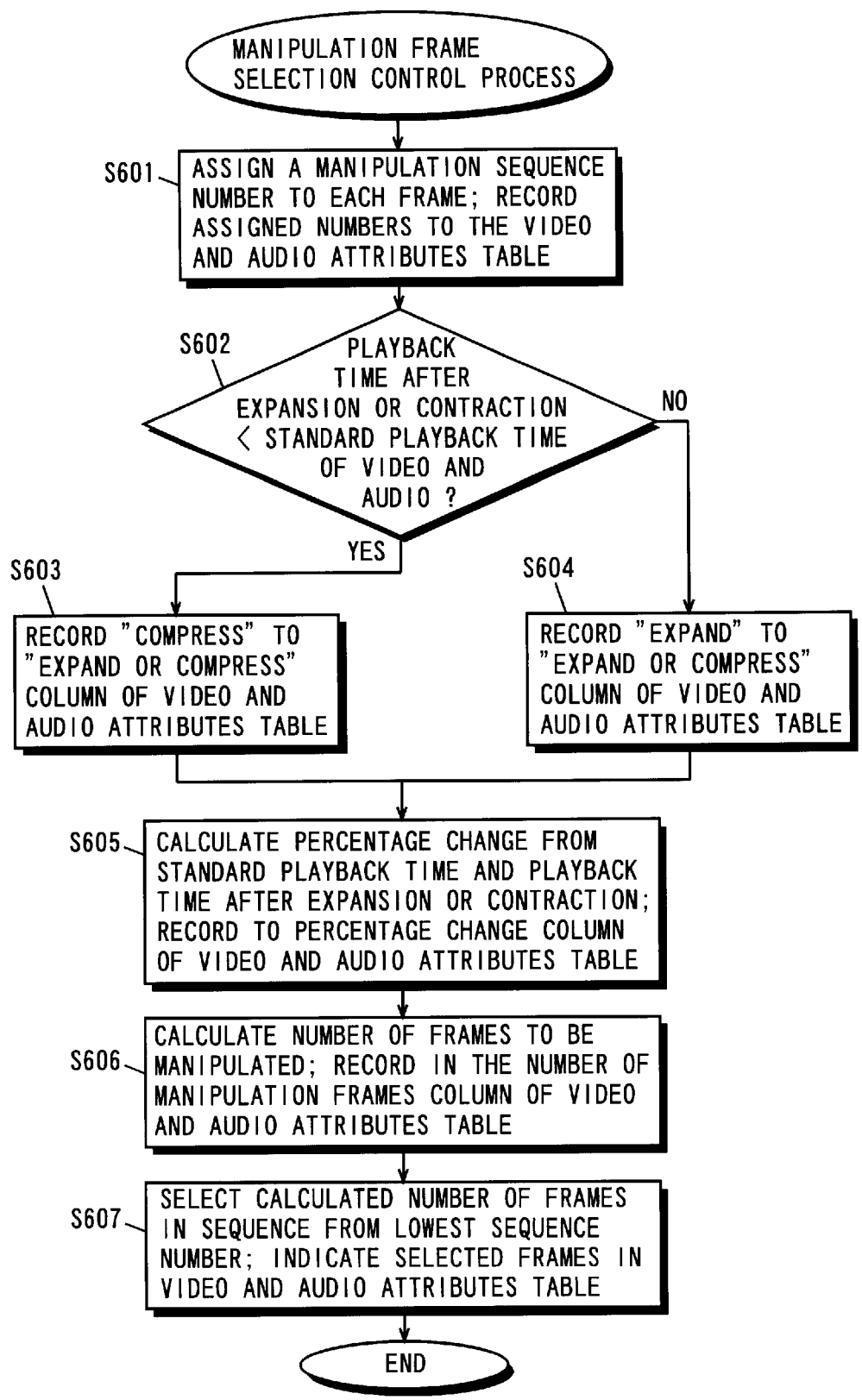
FIG. 6 is a flow chart of the frame selection control process performed by the controller 104 in FIG. 1 in a playback time expansion/compression apparatus 10 according to a first embodiment of the present invention.

FIG. 6 is a flow chart of the manipulation frame selection control process performed by the controller 104 in FIG. 1. This process starts by the controller 104 assigning a manipulation sequence number to each frame, and recording the assigned numbers to the manipulation sequence number column of the video and audio attributes table (FIG. 2) (step S601).

These manipulation sequence numbers can be assigned as follows, for example. First, numbers are sequentially assigned to the no-audio frames starting from the frame with the lowest rate of video change. When numbers have been assigned to all no-audio frames, numbers are sequentially assigned to the audio frames, continuing from the last number assigned to the last no-audio frame, starting from the frame with the lowest rate of video change.

By assigning a manipulation sequence number as described above, irritating clicking noises can be effectively prevented. In addition, CPU resources can be conserved and processing time reduced because processing is also simple. However, because no-audio frames with a high rate of video change are assigned a low sequence number, the video may appear unnatural to the user. To avoid this, a method such as follows can be used to assign manipulation sequence numbers. That is, a provisional number is first assigned to all frames in sequence from the frame with the lowest rate of video change, and these numbers are then resequenced to slightly increase the priority of no-audio frames.

Returning again to FIG. 6, the playback time after expansion or contraction is then input to the playback time expansion/compression apparatus 10. The controller 104 knows the standard playback time of the video and audio, that is, the playback time before it is increased or decreased, and compares this standard playback time with the desired playback time after expansion or contraction (step S602). If this comparison indicates that the playback time after expansion or contraction is shorter than the standard playback time, the controller 104 records "compress" to the "expand or compress" column of the video and audio attributes table (FIG. 2) (step S603). If the comparison indicates that the playback time after expansion or contraction is longer than the standard playback time, the controller 104 records "expand" to the "expand or compress" column of the video and audio attributes table (FIG. 2) (step S604).

The controller 104 then obtains the percentage change in the playback time from the standard playback time and the playback time after expansion or contraction, and records the value to the percentage change column of the video and audio attributes table (FIG. 2) (step S605). Based on this percentage change, the controller 104 calculates the number of frames to be manipulated, and records this frame count in the number of frames column of the video and audio attributes table (FIG. 2) (step S606). Next, the controller 104 selects the same number of frames as that calculated in step S606 in sequence from the lowest manipulation sequence number assigned in step S601 as the manipulation frames. Each of the selected frames is then so flagged by writing a symbol, which is an open circle in this example, to the manipulation frame column of the video and audio attributes table (FIG. 2) (step S607).

This completes the manipulation frame selection control process. This process is then followed by a process for outputting the video and audio temporarily stored to the video and audio recording means 103. In this process the video and audio transmitter 105 manipulates the selected manipulation frames as described below, outputs the video and audio, and thus increases or decreases the playback time.

Figure 7:
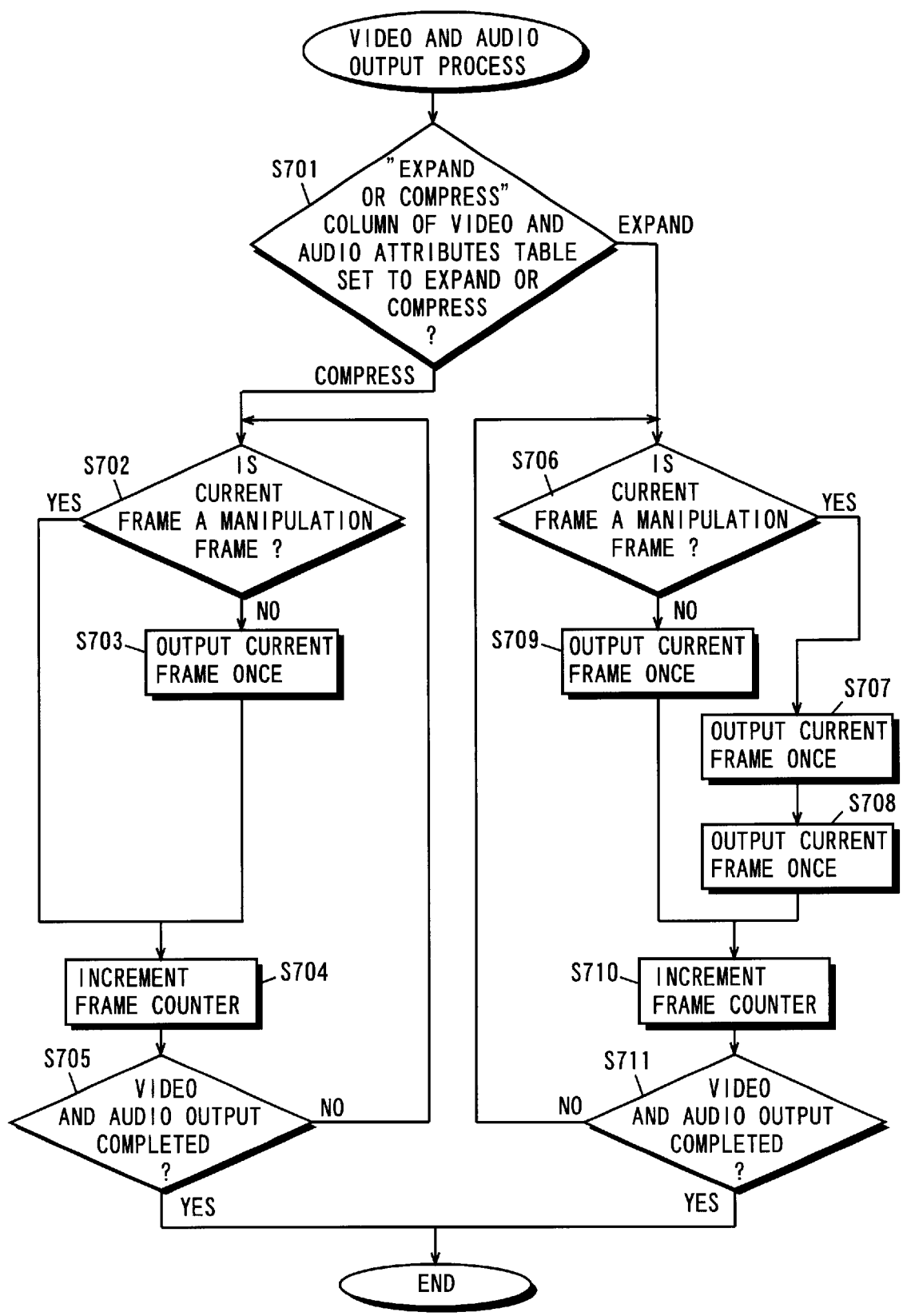
FIG. 7 is a flow chart of the process performed by the video and audio transmitter 105 in the playback time expansion/compression apparatus 10 shown in FIG. 1.

FIG. 7 is a flow chart of the process performed by the video and audio transmitter 105 shown in FIG. 1. FIG. 7 shows the process performed by the video and audio transmitter 105 to sequentially read and output from the first frame the video and audio recorded to the video and audio recording means 103. The first step in this process (step S701) is to refer to the video and audio attributes table (FIG. 2) and determine whether the expand or compress column has been set to expand or compress. If it is "compress," steps S702 to S705 are performed; if "expand," steps S706 to S711 are performed.

If the expand or compress column has been set to compress, the video and audio transmitter 105 refers to the manipulation frame column of the video and audio attributes table (FIG. 2) to determine whether the frame it is preparing to output has been flagged as a manipulation frame, that is, whether the column is flagged with an open circle in this example (step S702). If the current output frame is not flagged as a manipulation frame, the video and audio for that frame are read and output from the video and audio recording means 103 (step S703); if the current output is flagged as a manipulation frame, the process of reading and outputting the video and audio for that frame is skipped. This process is repeated until outputting the video and audio recorded to the video and audio recording means 103 is completed (steps S704 and S705).

If the expand or compress column has been set to expand, the video and audio transmitter 105 refers to the manipulation frame column of the video and audio attributes table (FIG. 2) to determine whether the frame it is preparing to output has been flagged as a manipulation frame, that is, whether the column is flagged with an open circle in this example (step S706). If the current output frame is flagged as a manipulation frame, the video and audio for that frame are read and output from the video and audio recording means 103 twice (step S707 and step S708); if the current output frame is not flagged as a manipulation frame, the video and audio for that frame are read and output from the video and audio recording means 103 once (step S709). This process is repeated until outputting the video and audio recorded to the video and audio recording means 103 is completed (steps S710 and S711).

More specifically, when the playback time is to be decreased, the video and audio transmitter 105 drops the frames flagged as manipulation frames, that is, no-audio frames with a low rate of video change, when outputting the video and audio (in other words, skips the frames that have no audio and have a low rate of video change). When the playback time is to be increased, it outputs the frames flagged as manipulation frames twice, that is, no-audio frames with a low rate of video change, and outputs the other frames once. The video and audio transmission process then ends.

As will be known from the preceding description, a playback time expansion/compression apparatus according to this preferred embodiment can increase the playback time by outputting frames with a low rate of video change and a low audio level twice, and can compress the playback time by dropping frames with a low rate of video change. It is therefore possible to increase or decrease the playback time more easily and in less time compared with re-editing the video and audio stream to change the playback time. The viewer also perceives more natural video and audio compared with changing the playback time by changing the playback speed because there is no slowing of image motion and drop in audio pitch, or quickening of image motion and rise in audio pitch.

It should be noted that frames with a low rate of video change and low audio level are selected as the frames to be manipulated in this preferred embodiment. However, insofar as frames with at least a low rate of video change are selected for the above-described operation, the playback time can be increased or decreased more easily and in less time than is required by re-editing the video and audio to change the playback time. The viewer also perceives more natural video compared with changing the playback time by changing the playback speed because there is no increase or decrease in the speed of image motion.

It should be noted that while this preferred embodiment has been described as outputting the selected frames twice to increase the playback time, it will obvious that the selected frames can be output more than two times. For example, the number of times a selected frame is output can be changed according to the rate of video change.

It should also be noted that the selected frames may be concentrated in a particular part of the video with the above first embodiment. In this case the viewer may detect unnatural movement.

The second to fourth embodiments of the present invention therefore teach a playback time expansion/compression apparatus for preventing the concentration of selected manipulation frames in a particular part of the video.

Embodiment 2

The functional configuration of a playback time expansion/compression apparatus according to a second preferred embodiment of the present invention is identical to that of a playback time expansion/compression apparatus according to the first embodiment, and is therefore described below with reference to FIG. 1. The operation of a playback time expansion/compression apparatus according to this second embodiment is also identical to that of the first embodiment except for the following two differences.

The first difference is the video and audio attributes table.

FIG. 8 is an exemplary video and audio attributes table in which measurements are stored by the video change accumulator 101 and audio level accumulator 102 in FIG. 1, and manipulation sequence numbers are written by the controller 104.

The table shown in FIG. 8 differs from that in FIG. 2 in that the video frames are segmented into ☐ blocks (where ☐ is an integer of two or more) each containing a plurality of frames.

The second difference is the process for selecting the manipulation frames.

Figure 9:
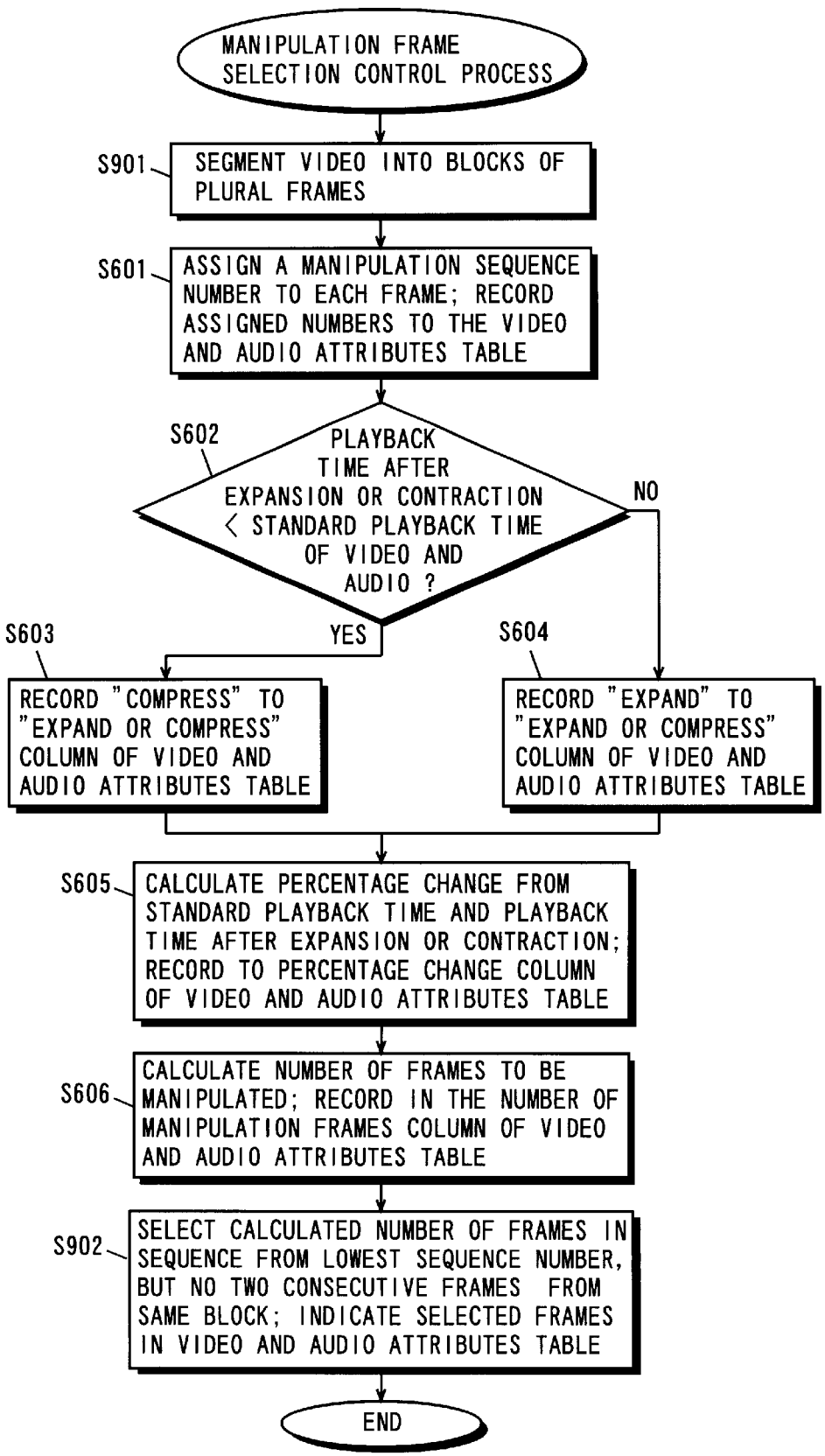
FIG. 9 is a flow chart of the frame selection control process performed by the controller 104 in FIG. 1 in a playback time expansion/compression apparatus 10 according to a second embodiment of the present invention.

FIG. 9 is a flow chart of the manipulation frame selection control process performed by the controller 104 in FIG. 1 according to this second preferred embodiment. The process shown in FIG. 9 differs from that in FIG. 6 in that step S607 is replaced by step S902, and a further step S901 is inserted before step S601.

In step S901 the controller 104 performs a process for segmenting the video stream into □ blocks each containing a plurality of frames.

If there are 300 total video frames, for example, this segmentation can be accomplished by dividing the 300 frames into ten blocks of 30 frames each.

It should be noted that, depending on the number of frames and the number of blocks, it will not always be possible to allocate an equal number of frames to every block. For example, if there are 298 total frames and ten blocks, blocks 1 to 8 may contain 30 frames with blocks 9 and 10 each containing 29 frames. As indicated by this case, insofar as possible, the segmentation process preferably achieves an even distribution of frames in each block.

In step S902, the controller 104 selects the same number of frames as that calculated in step S606 as the manipulation frames, and marks the selected frames in the video and audio attributes table (FIG. 8) by writing a symbol, which is an open circle in this example, to the manipulation frame column of the table. In this operation, the controller 104 selects frames in sequence from the lowest manipulation sequence number assigned in step S601 but does not consecutively select any two frames from the same block.

More specifically, assuming that manipulation sequence numbers are assigned as shown in FIG. 8 and the frames are selected in sequence from the lowest manipulation sequence number, the method of the first embodiment described above results in two frames from block □, that is, frame Y (assigned manipulation sequence number 1) and then frame X (assigned manipulation sequence number 2), being consecutively selected.

Using the method of this second embodiment, however, the controller 104 first selects frame Y in block □, and then selects a frame from any block other than block □.

In other words, the controller 104 selects the first frame by looking for the lowest manipulation sequence number in all blocks. In this example, the controller 104 thus selects frame Y, to which manipulation sequence number 1 was assigned, in block □.

The controller 104 then selects the next frame by looking for the lowest manipulation sequence number in all blocks other than block □. As a result, frame X in block □ is not selected and is skipped, and frame 3 assigned manipulation sequence number 3 is selected from block 1.

The controller 104 then looks in all blocks other than block 1 for the frame having the lowest manipulation sequence number. As a result, frame X assigned manipulation sequence number 2 is selected from block □.

The controller 104 then completes the selection process by repeating the above operation.

It should be noted that frames that are not selected and once skipped in the above selection process (frame X in the above example) can be eliminated from consideration thereafter. In this case, the third frame selected in the above example would not be frame X, but would be the frame assigned manipulation sequence number 4 (not shown in the table).

It should be further noted that the processes other than the manipulation frame selection control process, that is, the rate of video change measurement and accumulation process, the audio level measurement and accumulation process, and the video and audio output process (see FIG. 3 to FIG. 5 and FIG. 7), are the same as in the first embodiment, and further description thereof is thus omitted below.

It is therefore possible by means of this preferred embodiment of the present invention to prevent user perception of unnatural image motion resulting from concentration of the manipulation frames in a particular part of the video.

Embodiment 3

The functional configuration of a playback time expansion/compression apparatus according to a third preferred embodiment of the present invention is identical to that of a playback time expansion/compression apparatus according to the first embodiment, and is therefore described below with reference to FIG. 1. The operation of a playback time expansion/compression apparatus according to this third embodiment is also identical to that of the first embodiment except for the following two differences.

The first difference is the video and audio attributes table.

The video and audio attributes table to which the video change accumulator 101 and audio level accumulator 102 accumulate results and the controller 104 records manipulation sequence numbers is the same as that used in the second embodiment as shown in FIG. 8, which is therefore used below.

The second difference is the process for selecting the manipulation frames.

Figure 10:
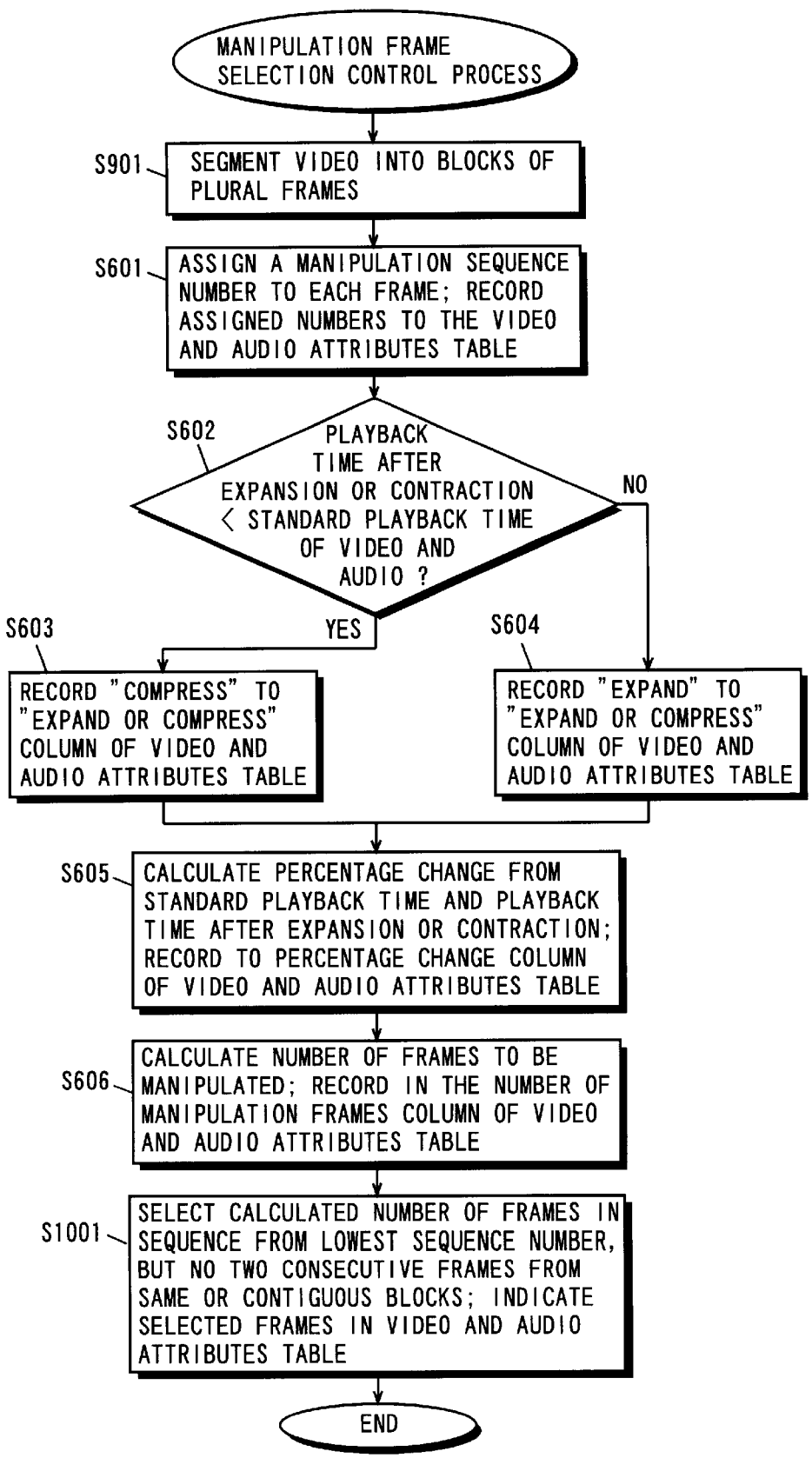
FIG. 10 is a flow chart of the frame selection control process performed by the controller 104 in FIG. 1 in a playback time expansion/compression apparatus 10 according to a third embodiment of the present invention.

FIG. 10 is a flow chart of the manipulation frame selection control process performed by the controller 104 in FIG. 1 according to this third preferred embodiment.

The process shown in FIG. 10 differs from that in FIG. 6 in that step S607 is replaced by step S1001, and a further step S901 is inserted before step S601.

This step S901 is the same as step S901 in FIG. 9. That is, the controller 104 performs a process for segmenting the video stream into □ blocks each containing a plurality of frames as described above in reference to the second embodiment.

Step S1001 is also the same as step S902 in FIG. 9 except that in addition to not selecting consecutive frames from the same block, frames are also not consecutively selected from contiguous blocks. It will be remembered that in step S902 in the above second embodiment, frames are not consecutively selected from the same block during the manipulation frame selection process.

More specifically, in step S1001, the controller 104 selects the same number of frames as that calculated in step S606 as the manipulation frames, and marks the selected frames in the video and audio attributes table (FIG. 8) by writing a symbol, which is an open circle in this example, to the manipulation frame column of the table. In this operation, the controller 104 selects frames in sequence from the lowest manipulation sequence number assigned in step S601 but does not consecutively select any two frames from the same block or from adjacent blocks.

Referring to FIG. 8, for example, if a manipulation frame is selected from block □, the next selected frame will be the frame with the lowest manipulation sequence number in any block other than blocks □ and (□−1).

Likewise, if a manipulation frame has been selected from block 3 (not shown in the figure), the selected frame will be the frame with the lowest manipulation sequence number in any block other than block 2 to block 4.

It should also be noted that, as in the second embodiment, frames that are not selected and once skipped in the above selection process can be eliminated from consideration thereafter.

It should be further noted that the processes other than the manipulation frame selection control process, that is, the rate of video change measurement and accumulation process, the audio level measurement and accumulation process, and the video and audio output process (see FIG. 3 to FIG. 5 and FIG. 7), are the same as in the first embodiment, and further description thereof is thus omitted below.

It is therefore possible by means of this preferred embodiment of the invention to prevent user perception of unnatural image motion resulting from concentration of the manipulation frames in a particular part of the video.

Embodiment 4

The functional configuration of a playback time expansion/compression apparatus according to a fourth preferred embodiment of the present invention is identical to that of a playback time expansion/compression apparatus according to the first embodiment, and is therefore described below with reference to FIG. 1. The operation of a playback time expansion/compression apparatus according to this fourth embodiment is also identical to that of the first embodiment except for the following two differences.

The first difference is the video and audio attributes table.

FIG. 11 is an exemplary video and audio attributes table to which the video change accumulator 101 and audio level accumulator 102 accumulate results and the controller 104 records manipulation sequence numbers.

The table shown in FIG. 11 differs from the table shown in FIG. 2 in the following three ways. First, the video frames are segmented into □ blocks (where □ is an integer of two or more) each containing a plurality of frames. Second, the number of manipulation frames per block is recorded instead of the total number of manipulation frames in the video stream. Third, a manipulation sequence number within the block is recorded instead of a manipulation sequence number that is consecutive throughout the entire video stream.

The second difference is the process for selecting the manipulation frames.

FIG. 12 is a flow chart of the manipulation frame selection control process performed by the controller 104 in FIG. 1 according to this fourth preferred embodiment.

The process shown in FIG. 12 differs from that in FIG. 6 in that step S601 is replaced by step S1201, step S606 is replaced by step S1202, step S607 is replaced by step S1203, and step S901 is inserted before step S1201.

This step S901 is the same as step S901 in FIG. 9. That is, the controller 104 performs a process for segmenting the video stream into □ blocks each containing a plurality of frames as described above in reference to the second embodiment.

If there are 300 total video frames, for example, this segmentation can be accomplished by dividing the 300 frames into ten blocks of 30 frames each.

Step S1201 is also identical to step S601 in FIG. 6 except that the manipulation sequence numbers are assigned within each block. It will be remembered that in step S601 the manipulation sequence numbers are assigned to the entire video sequence, that is, a single sequence of consecutive numbers is used for all video frames (see the first embodiment above).

More specifically, in step S1201 according to the present embodiment, the controller 104 first assigns manipulation sequence numbers to the frames in block 1, then resets the manipulation sequence number counter to assign numbers to the frames in block 2, and thereafter repeats this process to similarly assign a manipulation sequence number to the frames in every block to block □.

Therefore, if there are 300 total video frames segmented into ten blocks of 30 frames each, the thirty frames in block 1 are assigned a manipulation sequence number from 1 to 30, and the thirty frames in each of blocks 2 to □ are likewise assigned a manipulation sequence number from 1 to 30.

Step S1202 is likewise the same as step S606 in FIG. 6 except that the number off frames to be manipulated is calculated per block. It will also be remembered that in step S606 the number of frames to be manipulated is calculated for the total number of video frames (see the first embodiment above).

More specifically, in step S1202 according to the present embodiment, the controller 104 calculates the number of frames to manipulate per block based on the percentage change calculated in step S605, and then writes this value to the manipulation frames per block column of the video and audio attributes table in FIG.

The number of manipulation frames per block can be calculated by first determining the number of manipulation frames for the total video frames, and then dividing that value by the number of blocks.

It should be noted that depending upon the total number of manipulation frames and the number of blocks, there may not be the same number of manipulation frames in each block. For example, if the total number of manipulation frames is 28 and there are ten blocks, there will be three manipulation frames per block in blocks 1 to 8, and two manipulation frames per block in blocks 9 and 10.

As will be obvious from the above, however, the number of manipulation frames per block is preferably determined such that there is an equal number of manipulation frames in each block.

Step S1203 is likewise the same as step S607 in FIG. 6 except that the manipulation frames are selected per block. It will also be remembered that in step S607 the manipulation frames are selected from among all video frames (see the first embodiment above)

More specifically, in step S1203 according to the present embodiment, the controller 104 performs the following process for block 1 first. That is, the controller 104 selects the same number of frames as the number of manipulation frames per block calculated in step S1202 in sequence from the lowest manipulation sequence number assigned in step S1201 as the manipulation frames in each block. Each of the selected frames is then so flagged by writing a symbol, which is an open circle in this example, to the manipulation frame column of the video and audio attributes table in FIG. 11.

This same process is repeated in block 2 and each subsequent block through block □.

It should be further noted that the processes other than the manipulation frame selection control process, that is, the rate of video change measurement and accumulation process, the audio level measurement and accumulation process, and the video and audio output process (see FIG. 3 to FIG. 5 and FIG. 7), are the same as in the first embodiment, and further description thereof is thus omitted below.

It is therefore possible by means of this preferred embodiment of the invention to prevent user perception of unnatural image motion resulting from concentration of the manipulation frames in a particular part of the video.

Comparing the above second to fourth embodiments to each other, it should be noted that the third embodiment disperses the selected manipulation frames through a greater image area than does the second embodiment, and in the fourth embodiment the selected manipulation frames are dispersed evenly throughout the entire video. As a result, the sense of unnaturalness perceptible to the user successively decreases from the second to the fourth embodiment.

While the invention has been described in detail, the foregoing description is in all aspects illustrative and not restrictive. It is understood that numerous other modifications and variations can be devised without departing from the scope of the invention.

What is claimed is:

1. A playback time expansion method for lengthening a playback time of digitized video, comprising:
   a step for measuring a rate of video change for all frames in the digitized video,
      said rate of video change indicating how much video in a particular frame has changed compared with video in a frame before and a frame after;
   a step for recording said video;
   a step for calculating a number of manipulation frames based on a playback time before said video playback time expansion and a playback time after said video playback time expansion,
      said number of manipulation frames indicating a number of frames to be manipulated in the total number of frames in said video;
   a step for selecting a number of frames equal to said number of manipulation frames from among all frames in said video in sequence from the lowest rate of video change; and
   a step for outputting recorded video;
      wherein said step for outputting recorded video is characterized by manipulating said selected frames such that the video of each selected frame is output a plurality of times.

2. The playback time expansion method as set forth in claim 1, wherein digitized audio is associated with said video, said method further comprises:
   a step for measuring an audio level for every frame in said video, and
   said step for frame selection is characterized by selecting frames with priority for frames in which said audio level is below a predetermined level.

3. The playback time expansion method as set forth in claim 1, further comprising:
   a step for segmenting the total number of frames in said video into a plurality of blocks;
      wherein said step for frame selection is characterized by selecting a frame from one of a plurality of said blocks, and then selecting a next frame from a block other than said one block.

4. The playback time expansion method as set forth in claim 1, further comprising:
   a step for segmenting the total number of frames in said video into a plurality of blocks;
      wherein said step for frame selection is characterized by selecting a frame from one of a plurality of said blocks, and then selecting a next frame from a block other than said one block and any block adjacent thereto.

5. The playback time expansion method as set forth in claim 1, further comprising:
   a step for segmenting the total number of frames in said video into a plurality of blocks;
      wherein said step for frame selection is characterized by selecting frames equally from said plurality of blocks.

6. A playback time compression method for shortening a playback time of digitized video, comprising:
   a step for measuring a rate of video change for all frames in the digitized video,
      said rate of video change indicating how much video in a particular frame has changed compared with video in a frame before and a frame after;
   a step for recording said video;
   a step for calculating a number of manipulation frames based on a playback time before said video playback time compression and a playback time after said video playback time compression,
      said number of manipulation frames indicating a number of frames to be manipulated in the total number of frames in said video;
   a step for selecting a number of frames equal to said number of manipulation frames from among all frames in said video in sequence from the lowest rate of video change; and
   a step for outputting recorded video;
      wherein said step for outputting recorded video is characterized by manipulating said selected frames such that the video of each selected frame is not output.

7. The playback time compression method as set forth in claim 6, wherein digitized audio is associated with said video, said method further comprises:
   a step for measuring an audio level for every frame in said video, and
   said step for frame selection is characterized by selecting frames with priority for frames in which said audio level is below a predetermined level.

8. The playback time compression method as set forth in claim 6, further comprising:
   a step for segmenting the total number of frames in said video into a plurality of blocks;
      wherein said step for frame selection is characterized by selecting a frame from one of a plurality of said blocks, and then selecting a next frame from a block other than said one block.

9. The playback time compression method as set forth in claim 6, further comprising:
   a step for segmenting the total number of frames in said video into a plurality of blocks;
      wherein said step for frame selection is characterized by selecting a frame from one of a plurality of said blocks, and then selecting a next frame from a block other than said one block and any block adjacent thereto.

10. The playback time compression method as set forth in claim 6, further comprising:
    a step for segmenting the total number of frames in said video into a plurality of blocks;
       wherein said step for frame selection is characterized by selecting frames equally from said plurality of blocks.

11. A playback time expansion apparatus for lengthening a playback time of digitized video, comprising:
    rate of video change measuring means for measuring a rate of video change for all frames in the digitized video,
       said rate of video change indicating how much video in a particular frame has changed compared with video in a frame before and a frame after;
    recording means for recording said video;

calculating means for calculating a number of manipulation frames based on a playback time before said video playback time expansion and a playback time after said video playback time expansion,
   said number of manipulation frames indicating a number of frames to be manipulated in the total number of frames in said video;

frame selecting means for selecting a number of frames equal to said number of manipulation frames from among all frames in said video in sequence from the lowest rate of video change; and output means for outputting video recorded by the recording means;
   wherein said output means is characterized by manipulating said selected frames during video output such that the video of each frame selected by said frame selecting means is output a plurality of times.

12. The playback time expansion apparatus as set forth in claim 11, wherein digitized audio is associated with said video, said apparatus further comprises:

audio level measuring means for measuring an audio level for every frame in said video, and said frame selecting means is characterized by selecting frames with priority for frames in which said audio level is below a predetermined level.

13. The playback time expansion apparatus as set forth in claim 11, further comprising:

means for segmenting the total number of frames in said video into a plurality of blocks;
   wherein said frame selecting means is characterized by selecting a frame from one of a plurality of said blocks, and then selecting a next frame from a block other than said one block.

14. The playback time expansion apparatus as set forth in claim 11, further comprising:

means for segmenting the total number of frames in said video into a plurality of blocks;
   wherein said frame selecting means is characterized by selecting a frame from one of a plurality of said blocks, and then selecting a next frame from a block other than said one block and any block adjacent thereto.

15. The playback time expansion apparatus as set forth in claim 11, further comprising:

means for segmenting the total number of frames in said video into a plurality of blocks;
   wherein said frame selecting means is characterized by selecting frames equally from said plurality of blocks.

16. A playback time compression apparatus for shortening a playback time of digitized video, comprising:

rate of video change measuring means for measuring a rate of video change for all frames in the digitized video,
   said rate of video change indicating how much video in a particular frame has changed compared with video in a frame before and a frame after;

recording means for recording said video;

calculating means for calculating a number of manipulation frames based on a playback time before said video playback time compression and a playback time after said video playback time compression,
   said number of manipulation frames indicating a number of frames to be manipulated in the total number of frames in said video;

frame selecting means for selecting a number of frames equal to said number of manipulation frames from among all frames in said video in sequence from the lowest rate of video change; and output means for outputting video recorded by the recording means;
   wherein said output means is characterized by manipulating said selected frames during video output such that the video of each frame selected by said frame selecting means is not output.

17. The playback time compression apparatus as set forth in claim 16, wherein digitized audio is associated with said video, said apparatus further comprises:

audio level measuring means for measuring an audio level for every frame in said video, and said frame selecting means is characterized by selecting frames with priority for frames in which said audio level is below a predetermined level.

18. The playback time compression apparatus as set forth in claim 16, further comprising:

means for segmenting the total number of frames in said video into a plurality of blocks;
   wherein said frame selecting means is characterized by selecting a frame from one of a plurality of said blocks, and then selecting a next frame from a block other than said one block.

19. The playback time compression apparatus as set forth in claim 16, further comprising:

means for segmenting the total number of frames in said video into a plurality of blocks;
   wherein said frame selecting means is characterized by selecting a frame from one of a plurality of said blocks, and then selecting a next frame from a block other than said one block and any block adjacent thereto.

20. The playback time compression apparatus as set forth in claim 16, further comprising:

means for segmenting the total number of frames in said video into a plurality of blocks;
   wherein said frame selecting means is characterized by selecting frames equally from said plurality of blocks.

21. A recording medium for recording a computer executable program achieving an operating environment for lengthening a playback time of digitized video, said program comprising:

a step for measuring a rate of video change for all frames in the digitized video,
   said rate of video change indicating how much video in a particular frame has changed compared with video in a frame before and a frame after;

a step for recording said video;

a step for calculating a number of manipulation frames based on a playback time before said video playback time expansion and a playback time after said video playback time expansion,
   said number of manipulation frames indicating a number of frames to be manipulated in the total number of frames in said video;

a step for selecting a number of frames equal to said number of manipulation frames from among all frames in said video in sequence from the lowest rate of video change; and a step for outputting recorded video;
   wherein said step for outputting recorded video is characterized by manipulating said selected frames such that the video of each selected frame is output a plurality of times.

22. The recording medium as set forth in claim 21 for recording a computer executable program achieving an operating environment wherein digitized audio is associated with said video, and said program further comprises:
- a step for measuring an audio level for every frame in said video, and
- said step for frame selection is characterized by selecting frames with priority for frames in which said audio level is below a predetermined level.

23. The recording medium as set forth in claim 21 for recording a computer executable program achieving an operating environment further comprising:
- a step for segmenting the total number of frames in said video into a plurality of blocks;
  - wherein said step for frame selection is characterized by selecting a frame from one of a plurality of said blocks, and then selecting a next frame from a block other than said one block.

24. The recording medium as set forth in claim 21 for recording a computer executable program achieving an operating environment further comprising:
- a step for segmenting the total number of frames in said video into a plurality of blocks;
  - wherein said step for frame selection is characterized by selecting a frame from one of a plurality of said blocks, and then selecting a next frame from a block other than said one block and any block adjacent thereto.

25. The recording medium as set forth in claim 21 for recording a computer executable program achieving an operating environment further comprising:
- a step for segmenting the total number of frames in said video into a plurality of blocks;
  - wherein said step for frame selection is characterized by selecting frames equally from said plurality of blocks.

26. A recording medium for recording a computer executable program achieving an operating environment for shortening a playback time of digitized video, said program comprising:
- a step for measuring a rate of video change for all frames in the digitized video,
  - said rate of video change indicating how much video in a particular frame has changed compared with video in a frame before and a frame after;
- a step for recording said video;
- a step for calculating a number of manipulation frames based on a playback time before said video playback time compression and a playback time after said video playback time compression,
  - said number of manipulation frames indicating a number of frames to be manipulated in the total number of frames in said video;
- a step for selecting a number of frames equal to said number of manipulation frames from among all frames in said video in sequence from the lowest rate of video change; and
- a step for outputting recorded video;
  - wherein said step for outputting recorded video is characterized by manipulating said selected frames such that the video of each selected frame is not output.

27. The recording medium as set forth in claim 26 for recording a computer executable program achieving an operating environment wherein digitized audio is associated with said video, and said program further comprises:
- a step for measuring an audio level for every frame in said video, and
- said step for frame selection is characterized by selecting frames with priority for frames in which said audio level is below a predetermined level.

28. The recording medium as set forth in claim 26 for recording a computer executable program achieving an operating environment further comprising:
- a step for segmenting the total number of frames in said video into a plurality of blocks;
  - wherein said step for frame selection is characterized by selecting a frame from one of a plurality of said blocks, and then selecting a next frame from a block other than said one block.

29. The recording medium as set forth in claim 26 for recording a computer executable program achieving an operating environment further comprising:
- a step for segmenting the total number of frames in said video into a plurality of blocks;
  - wherein said step for frame selection is characterized by selecting a frame from one of a plurality of said blocks, and then selecting a next frame from a block other than said one block and any block adjacent thereto.

30. The recording medium as set forth in claim 26 for recording a computer executable program achieving an operating environment further comprising:
- a step for segmenting the total number of frames in said video into a plurality of blocks;
  - wherein said step for frame selection is characterized by selecting frames equally from said plurality of blocks.

31. A playback time expansion and compression method for lengthening or shortening a playback time of digitized video, comprising:
- a step for measuring a rate of video change for all frames in the digitized video,
  - said rate of video change indicating how much video in a particular frame has changed compared with video in a frame before and a frame after;
- a step for recording said video;
- a step for determining a manipulation sequence number for every frame in said video in relation to said rate of video change,
  - said manipulation sequence number indicating a sequence in which said frames are to be manipulated;
- a step for compiling a table recording said manipulation sequence numbers;
- a step for calculating a number of manipulation frames based on a playback time before said video playback time expansion/compression and a playback time after said video playback time expansion/compression,
  - said number of manipulation frames indicating a number of frames to be manipulated in the total number of frames in said video;
- a step for selecting, in reference to said table, a number of frames equal to said number of manipulation frames from among all frames in said video in sequence from the lowest rate of video change; and
- a step for outputting recorded video;
  - wherein said step for outputting recorded video is characterized by manipulating said selected frames such that
    - when said playback time is lengthened, the video of each selected frame is output a plurality of times, and
    - when said playback time is shortened, the video of each selected frame is not output.

* * * * *